US012785181B2

(12) United States Patent
Jung et al.

(10) Patent No.: US 12,785,181 B2
(45) Date of Patent: Nov. 3, 2026

(54) BUTTON-TYPE SECONDARY BATTERY

(71) Applicant: LG ENERGY SOLUTION, LTD., Seoul (KR)

(72) Inventors: Yeong Hun Jung, Daejeon (KR); Young Ji Tae, Daejeon (KR); Joo Hwan Sung, Daejeon (KR); Min Su Cho, Daejeon (KR); Geun Young Park, Daejeon (KR); Min Gyu Kim, Daejeon (KR); Min Seon Kim, Daejeon (KR); Sang Hak Chae, Daejeon (KR); Min Young Ju, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 256 days.

(21) Appl. No.: 18/277,362

(22) PCT Filed: Oct. 14, 2022

(86) PCT No.: PCT/KR2022/015658
§ 371 (c)(1),
(2) Date: Aug. 15, 2023

(87) PCT Pub. No.: WO2023/063798
PCT Pub. Date: Apr. 20, 2023

(65) Prior Publication Data

US 2024/0128554 A1 Apr. 18, 2024

(30) Foreign Application Priority Data

Oct. 14, 2021 (KR) ........................ 10-2021-0136977

(51) Int. Cl.
*H01M 50/14* (2021.01)
*H01M 10/643* (2014.01)
(Continued)

(52) U.S. Cl.
CPC ......... *H01M 50/14* (2021.01); *H01M 10/643* (2015.04); *H01M 10/658* (2015.04);
(Continued)

(58) Field of Classification Search
CPC .................................................. H01M 50/109
See application file for complete search history.

(56) References Cited

U.S. PATENT DOCUMENTS

2007/0154787 A1 7/2007 Jang et al.
2009/0111025 A1 4/2009 Lee et al.
(Continued)

FOREIGN PATENT DOCUMENTS

JP 2010-055987 A 3/2010
JP 2011-119250 A 6/2011
(Continued)

OTHER PUBLICATIONS

WO-2020036440-A1translation (Year: 2020).*
(Continued)

*Primary Examiner* — Brian R Ohara
(74) *Attorney, Agent, or Firm* — Morgan, Lewis & Bockius LLP

(57) ABSTRACT

A button type secondary battery includes a wound electrode assembly; a lower can with the electrode assembly and an electrolyte in the lower can; a top plate to close the lower can; a positive electrode terminal coupled to the top plate through a gasket to be electrically insulated from the top plate with a portion of the positive electrode terminal passing through a hole in the top plate to be bonded to a positive electrode tab; a top insulator covering a top surface of the electrode assembly; and a bottom insulator covering a bottom surface of the electrode assembly. The top insulator and the bottom insulator are each configured to expand in volume by absorbing the electrolyte. Surfaces of at least one
(Continued)

or more of the top insulator and the bottom insulator are coated with a protective layer configured to prevent thermal shrinkage from occurring.

9 Claims, 6 Drawing Sheets

(51) Int. Cl.

| | |
|---|---|
| ***H01M 10/658*** | (2014.01) |
| ***H01M 50/109*** | (2021.01) |
| ***H01M 50/169*** | (2021.01) |
| ***H01M 50/531*** | (2021.01) |

(52) U.S. Cl.
CPC ....... *H01M 50/109* (2021.01); *H01M 50/169* (2021.01); *H01M 50/531* (2021.01)

(56) References Cited

U.S. PATENT DOCUMENTS

| | | | | |
|---|---|---|---|---|
| 2011/0123853 | A1* | 5/2011 | Kim .................... | H01M 50/392 429/186 |
| 2016/0141565 | A1 | 5/2016 | Uhm et al. | |
| 2018/0241013 | A1 | 8/2018 | Vuille et al. | |
| 2019/0229303 | A1 | 7/2019 | Vuille et al. | |
| 2021/0328290 | A1 | 10/2021 | Lee et al. | |

FOREIGN PATENT DOCUMENTS

| | | | | |
|---|---|---|---|---|
| KR | 10-0686850 | B1 | 2/2007 | |
| KR | 10-0719725 | B1 | 5/2007 | |
| KR | 10-2007-0071241 | A | 7/2007 | |
| KR | 10-0775310 | B1 | 11/2007 | |
| KR | 10-2011-0057987 | A | 6/2011 | |
| KR | 10-2014-0017743 | A | 2/2014 | |
| KR | 10-2015-0014637 | A | 2/2015 | |
| KR | 10-2018-0096520 | A | 8/2018 | |
| KR | 10-2020-0020173 | A | 2/2020 | |
| KR | 10-2020-0020619 | A | 2/2020 | |
| KR | 10-2021-0006245 | A | 1/2021 | |
| KR | 10-2021-0114863 | A | 9/2021 | |
| WO | 2010/108148 | A1 | 9/2010 | |
| WO | WO-2020036440 | A1 * | 2/2020 | .......... H01M 50/186 |

OTHER PUBLICATIONS

Material properties of polyethylene (Year: 2026).*
Material properties of polypropylene (Year: 2026).*
PVDF (Year: 2026).*
Engineering toolbox (Year: 2026).*
Thermal properties (Year: 2026).*
PET properties (Year: 2026).*
International Search Report (with partial translation) and Written Opinion dated Jan. 19, 2023, for corresponding International Patent Application No. PCT/KR2022/015658.

* cited by examiner

BUTTON-TYPE SECONDARY BATTERY

CROSS-REFERENCE TO RELATED APPLICATION

The present application claims the benefit of the priority of Korean Patent Application No. 10-2021-0136977, filed on Oct. 14, 2021, which is hereby incorporated by reference in its entirety.

TECHNICAL FIELD

The present invention relates to a button-type secondary battery having a shape of which a diameter is greater than a height, and more particularly, to a button-type secondary battery in which a top insulator and a bottom insulator absorb an electrolyte so as to be expanded, thereby reducing an impact and vibration which are transferred to an electrode assembly and preventing short circuit due to an impact from progressing to fire or explosion.

BACKGROUND ART

A button type battery commonly used as a coin-type battery or a button type battery has a thin button shape and is widely used in various devices such as remote controllers, clocks, toys, computer parts, and the like.

Such a button type battery is mainly manufactured as a non-rechargeable primary battery, but is also widely manufactured as a secondary battery that is chargeable and dischargeable as miniaturized devices are developed. Also, the button type secondary battery also has a structure in which an electrode assembly and an electrolyte are embedded in a case to repeatedly perform charging and discharging, like a cylindrical or pouch-type secondary battery.

The button-type battery case generally employs a press-fitting method, in which an upper can is press-fitted into a lower can, and a welding method, in which a top plate is welded to a top surface of a lower can to reduce a height than that in the press-fitting method.

In general, the press-fitting method is performed by pressing and fitting the upper can to the lower can. Each of the upper can and the lower can has a flat cylindrical shape having a diameter greater than a height thereof, and the upper can has a diameter that is slightly greater than that of the lower can.

In addition, as illustrated in FIG. 1, the button-type secondary battery in which the lower can 20 and the top plate 30 are welded has a structure, in which an edge portion of a disk-shaped top plate 30 is coupled by seam welding to an upper end of a sidewall 22 of the lower can 20 having a schale shape.

Here, a positive electrode terminal 40 connected to a positive electrode tab 11 is coupled to the top plate 30, and the positive electrode terminal 40 and the top plate 30 are electrically insulated by a gasket 41. The positive electrode terminal 40 may be coupled in a rivet method, in which a diameter of each of an upper end 40*b* and a lower end 40*c* is expanded rather than that of an intermediate end 40*a* passing through the top plate 30 so that the positive electrode terminal 40 is coupled fixed to the top plate 30. However, although the coupling using the rivet method is illustrated in FIG. 1, it may be fixed to the top plate 30 by another method (e.g., thermal fusion method of a gasket, etc.).

In addition, an electrode assembly 10, in which a positive electrode, a separator, and a negative electrode are stacked, and an electrolyte (not shown) are mounted in the lower can

20. The electrode assembly 10 is put into and wound on a rotating core in order of a separator, a negative electrode, a separator, and a positive electrode (or other predetermined orders) and has a structure in which a center hole 10*a* is formed when the core is separated.

In addition, a negative electrode tab 12 extending from the negative electrode and a positive electrode tab 11 extending from the positive electrode protrude. Also, the negative electrode tab 12 is bonded to a bottom surface 21 of the lower can 20, and the positive electrode tab 11 is bonded to a positive electrode terminal 40 or the upper can according to the above-described coupling method.

Thus, the lower can 20 has a negative polarity, and the positive electrode terminal 40 has a positive polarity. Here, since the electrode assembly 10 is in a state in which the positive electrode, the separator, and the negative electrode are wound, a top insulator 1 and a bottom insulator 2, which are made of insulating materials, are respectively stacked or attached on top and bottom surfaces of the electrode assembly 10 to prevent the negative electrode provided in the electrode assembly 10 from being in contact with the positive electrode terminal 40 and prevent the positive electrode provided in the electrode assembly from being in contact with the lower can 20.

Regardless of the press-fitting method or the welding method, the electrode assembly 10 is embedded in the lower can 20 described above. In addition, when an external impact or vibration is applied, there is a problem in that the impact or vibration is directly transmitted to the electrode assembly 10, or the electrode assembly 10 is damaged or deformed due to crushing of each of the lower can 20, the upper can, or the top plate 30.

Particularly, since the positive electrode tab 11 and the negative electrode tab 12 may be bent during the welding, if the electrode assembly 10 is continuously shaken by the impact and vibration, there is a problem in that the positive electrode tab 11 or the negative electrode tab 12 is disconnected.

In addition, when the core is removed after the electrode assembly 10 is manufactured, there is a problem in that possibility of deformation due to the impact and vibration in the vicinity of the center hole 2 of the electrode assembly 10 further increases.

DISCLOSURE OF THE INVENTION

Technical Problem

Therefore, a main object of the present invention is to provide a button-type secondary battery, which has a structure that is more robust to an external impact and is capable of buffering an impact transmitted to an electrode assembly (by filling an inner space between a top plate and a top insulator and between a bottom insulator and a lower can).

In addition, another object of the present invention is to provide a button-type secondary battery in which a protective layer is applied on a surface of each of a top insulator and a bottom insulator to prevent thermal contraction from occurring, thereby preventing fire or explosion from occurring.

Technical Solution

According to an aspect of the present invention, there is provided a button type secondary battery, in which a top plate is coupled to a lower can through welding when an electrode assembly is mounted on the lower can, and an electrolyte is injected, the button type secondary battery including: an electrode assembly, which is manufactured by winding a negative electrode, a separator, and a positive electrode and from which a negative electrode tab extends downward, and a positive electrode tab extends upward; a lower can on which a sidewall is formed upward along a circumference of a bottom surface thereof, and the electrode assembly is mounted; a top plate of which an edge is coupled to an upper end of the sidewall of the lower can through welding to close the lower can; a positive electrode terminal which is coupled to the top plate through a gasket so as to be electrically insulated and of which a portion passes through a hole formed in the top plate so as to be bonded to a positive electrode tab; and a top insulator disposed to cover a top surface of the electrode assembly and having electrical insulation; and a bottom insulator disposed to cover a bottom surface of the electrode assembly and having electrical insulation, wherein each of the top insulator and the bottom insulator absorbs the electrolyte in the lower can so as to be expanded in volume, thereby fill a space, and surfaces of at least one or more of the top insulator and the bottom insulator are coated with a protective layer configured to prevent thermal shrinkage from occurring.

The top insulator may be configured to cover an entire top surface of the electrode assembly, and the bottom insulator may be provided in a plate shape having a size that is enough to cover an entire bottom surface of the electrode assembly. Each of the top insulator and the bottom insulator may have a structure in which a hole is punched through which a positive electrode and a negative electrode tab are drawn out.

The positive electrode terminal may be coupled in a rivet method in which a diameter of each of an upper end and a lower end is further expanded to be fixed than that a portion passing through a hole of the top plate.

The protective layer may include inorganic particles configured to provide heat resistance to the protective layer.

The protective layer may be manufactured by mixing the inorganic particles and a binder polymer that provides bonding force to adhere to the surface of the top insulator or the bottom insulator.

When the top insulator and the bottom insulator absorb the electrolyte so as to be expanded, each of the top insulator and the bottom insulator may be expanded to elastically press the electrode assembly vertically downward from an upper side.

One of the top insulator and the bottom surface may be further expanded vertically than the other one.

The protective layer configured to prevent the thermal shrinkage from occurring may be applied to a surface of each of all of the top insulator and the bottom insulator.

The protective layer may be applied to all of a surface of the top insulator, which faces the positive electrode terminal, and an opposite surface, and the protective layer may be applied to all of a surface of the bottom insulator, which faces the bottom surface of the lower can, and an opposite surface.

Furthermore, the present invention may additionally provide the secondary battery module in which the plurality of button-type secondary batteries having the above characteristics are electrically connected to each other.

Advantageous Effects

According to the present invention having the above-described technical characteristics, since the bottom insulator and the top insulator are expanded to fill the spaces inside the lower can, the external impact transmitted to the electrode assembly may be buffered, and the effect due to the vibration may be reduced.

Therefore, the electrode assembly may be prevented from being damaged, and the durability of the secondary battery may be further improved.

In addition, the degree of deformation of each of the top plate and the lower can may be reduced.

Since the bottom insulator and the top insulator are expanded in the state of being mounted on the electrode assembly, there is no need to increase in height of the lower can, thereby preventing the volume from unnecessarily increasing.

The protective layer for preventing the thermal shrinkage may be applied on the top surface or both the surfaces of the top insulator to prevent the thermal shrinkage of the top insulator and/or the bottom insulator due to the heat generated during the short circuit.

Therefore, the problem of the fire or explosion due to the increase in short-circuit current (due to the increase in the contact area between the positive electrode terminal and the negative electrode or between the top plate and the positive electrode) may be solved.

MODE FOR CARRYING OUT THE INVENTION

Figure 1:
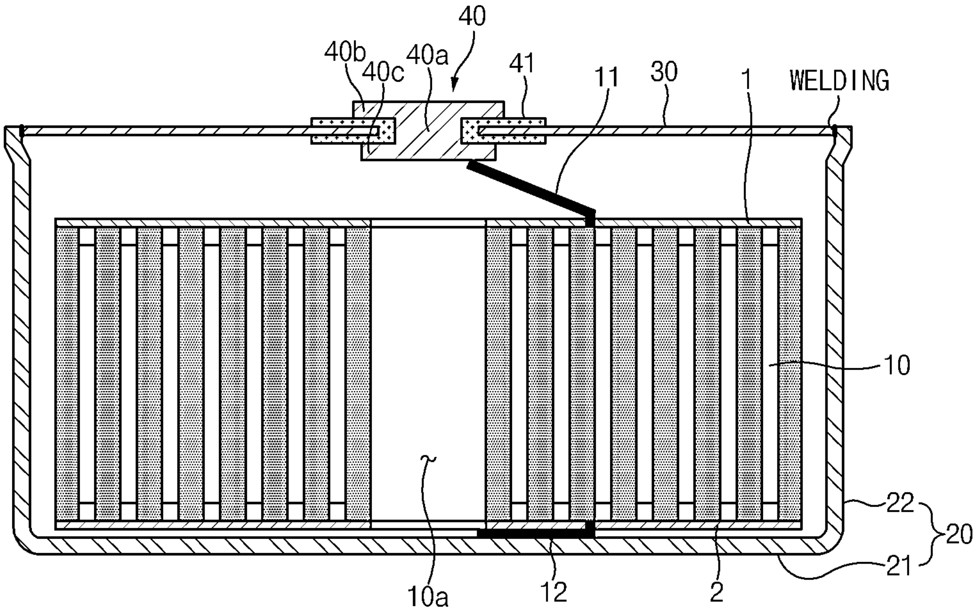
FIG. 1 is a longitudinal cross-sectional view of a button-type secondary battery according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a button-type secondary battery having a larger diameter than a height, and is characterized by having a structure, in which an electrode assembly 10 is protected from an external impact, and even if short circuit occurs, fire or explosion does not occur. Hereinafter, embodiments according to the present invention will be described with reference to the accompanying drawings.

Figure 2:
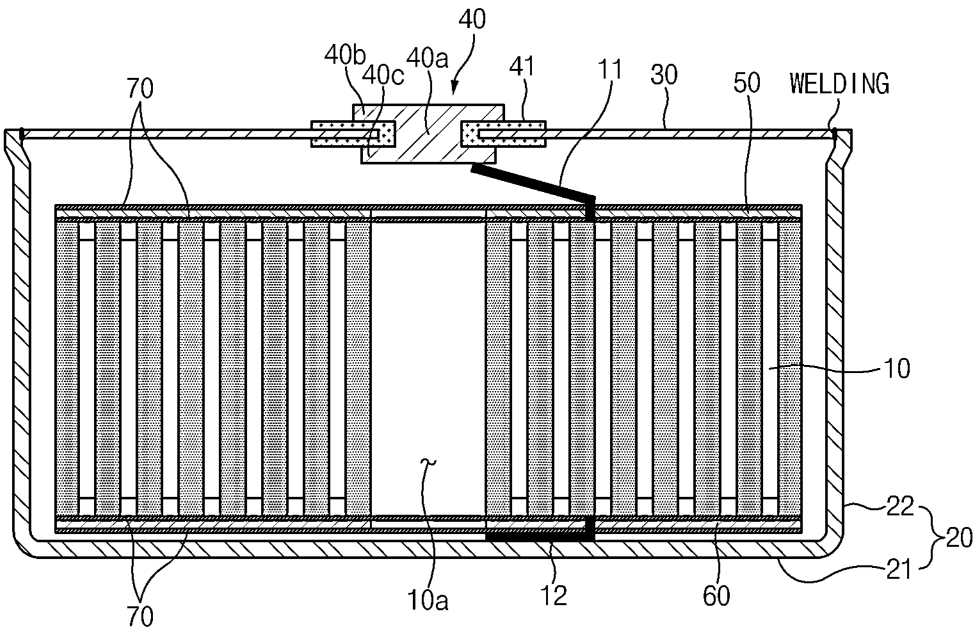
FIG. 2 is a longitudinal cross-sectional view of a button-type secondary battery according to the present invention, which illustrates a state in which a protective layer is applied on a surface of each of a top insulator and a bottom insulator.
Figure 3:
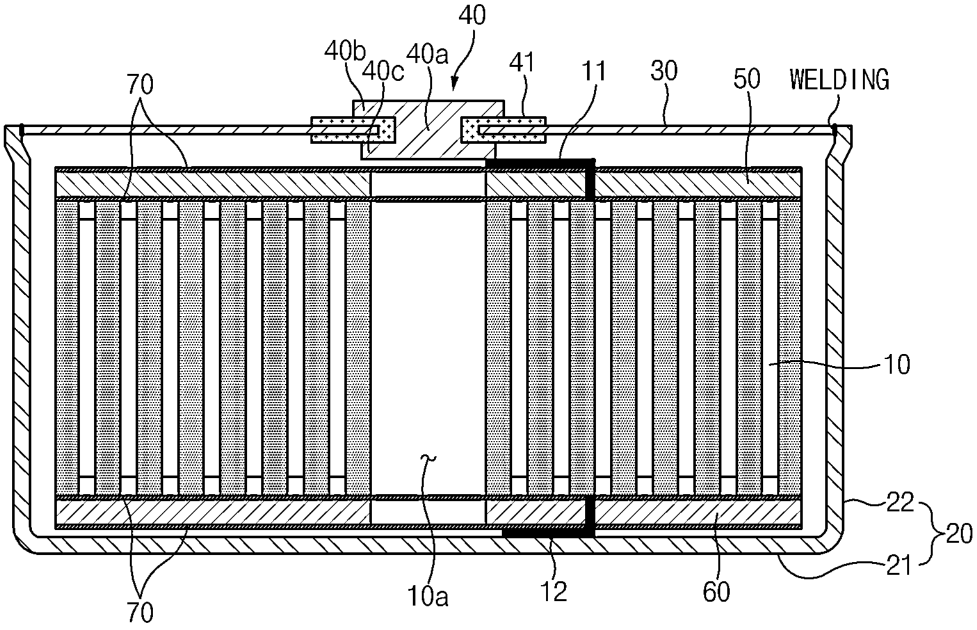
FIG. 3 is a view illustrating a state in which the top insulator and the bottom insulator, which are illustrated in FIG. 2, are expanded by absorbing an insulator.
Figure 4:
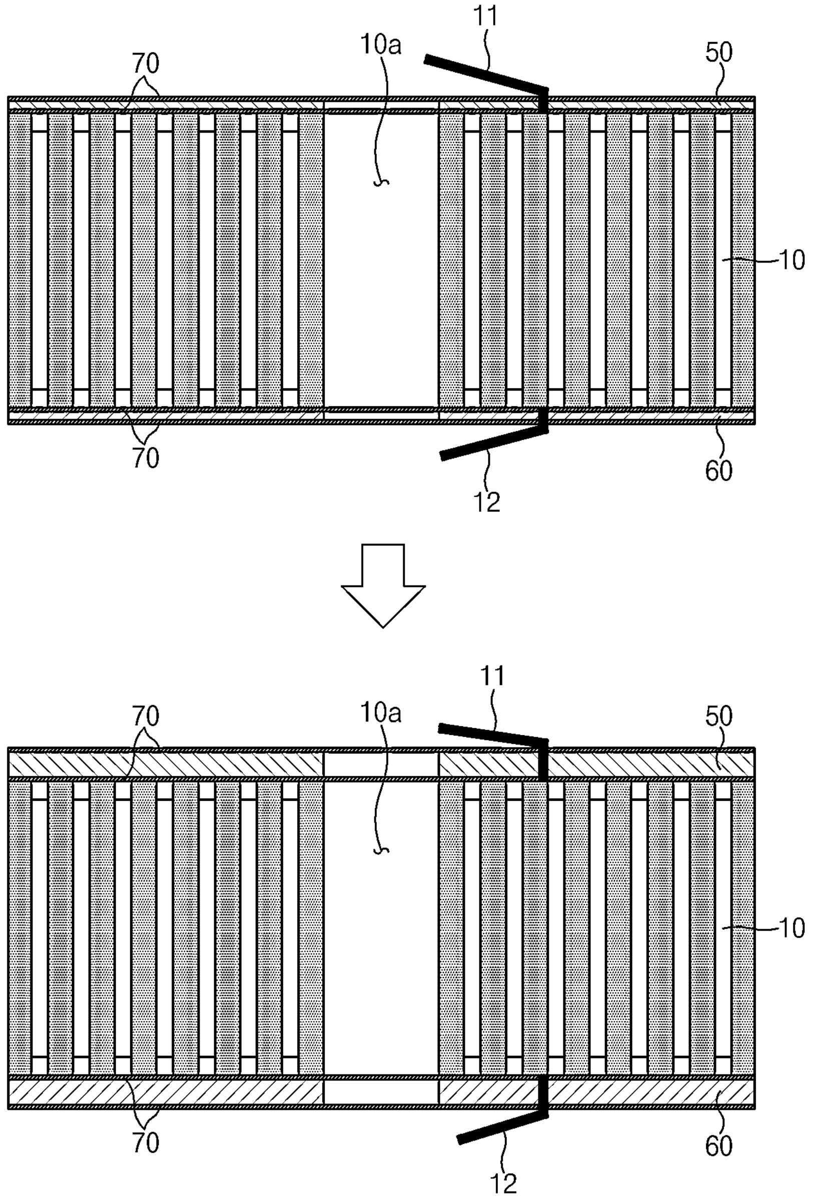
FIG. 4 is a view of an electrode assembly according to the present invention, which illustrates a stage before (upper drawing) and after (lower drawing) the top insulator and the bottom insulator are expanded.

FIG. 2 is a longitudinal cross-sectional view of a button-type secondary battery according to the present invention, which illustrates a state in which a protective layer is applied on a surface of each of a top insulator 50 and a bottom insulator 60, FIG. 3 is a view illustrating a state in which the top insulator 50 and the bottom insulator 60, which are illustrated in FIG. 2, are expanded by absorbing an insulator, and FIG. 4 is a view of an electrode assembly according to the present invention, which illustrates a stage before (upper drawing) and after (lower drawing) the top insulator 50 and the bottom insulator 60 are expanded.

Like the structure according to the related art, a button-type secondary battery provided in the embodiment of the present invention has a structure, in which a top plate 30 is welded to be coupled to a lower can 20 when the electrode assembly 10 is mounted on the lower can 20, and an electrolyte is injected, and includes the electrode assembly 10, the lower can 20, the top plate 30, a positive electrode terminal 40, a top insulator 50, and a bottom insulator 60.

The electrode assembly 10 has a structure, in which a separator, a negative electrode, a separator, and a positive electrode are put in and wound around a rotating core in order (or in another order) so that the separator, the negative electrode, the separator, and the positive electrode are wound in a laminated state, and when the core is separated after rotating, a center hole 10*a* is formed therein.

In addition, a negative electrode tab 12 extending from the negative electrode and a positive electrode tab 11 extending from the positive electrode protrude. The electrode assembly 10 is inserted into the lower can 20 (in some cases, may be inserted in an opposite direction) so that the negative electrode tab 12 is placed at a lower side, and the positive electrode tab 11 is placed at an upper side.

The lower can 20 has a sidewall 22 extending upward along a circumference of a bottom surface 21 thereof, the electrode assembly 20 is mounted into an inner space thereof, and an electrolyte is injected. In addition, the negative electrode tab 12 is welded to the bottom surface 21.

As the negative electrode tab 12 is welded to the lower can 20, the lower can 20 may have a negative polarity. Therefore, in order to prevent the lower can 20 and the positive electrode wound in the electrode assembly 10 from being in contact with each other, the electrode assembly 10 is mounted on the lower can 20 in a state in which a bottom insulator 60 having electrical insulation is stacked (attached) on the bottom surface of the electrode assembly 10.

Furthermore, for the same reason, in order to prevent the positive electrode terminal 40 connected to the positive electrode tab 11 and the negative electrode wound in the electrode assembly 10 from being in contact with each other, a top insulator 50 having electrical insulation is laminated (attached) on a top surface of the electrode assembly 10.

In the lower can 20, a sidewall 22 having a disk-shaped bottom surface 21 has a pipe shape extending vertically from the bottom surface 21 and having a short length. Thus, the top plate 30 is provided to have a disk shape having a size substantially similar to that of the bottom surface 21 of the lower can 20.

That is, a circumference of the top plate 30 is coupled to an upper end of the sidewall 22 through seam welding to close an opened upper side of the lower can 20. The top plate 30 has a structure in which a hole is punched in a center, and the positive electrode terminal 40 is coupled to the hole together with a gasket 41.

The positive terminal 40 is electrically insulated from the top plate 30 by the gasket 41 and is fixed to the top plate 30 by extending a diameter of each of an upper end 40*b* and a lower end 40*c* rather than an intermediate end 40*a*. That is, the positive electrode terminal 40 is coupled in a rivet method in which the diameter of each of the upper end 40*b* and the lower end 40*c* is further expanded to be fixed than a portion passing through a hole of the top plate 30.

As described above, the lower can 20 has a negative polarity, and the top plate 30 welded to the lower can 20 also has a negative polarity. However, since the positive electrode terminal 40 has the positive polarity, since the positive electrode terminal 40 and the top plate 30 have to be electrically insulated from each other, and thus, the gasket 41 may be essentially provided. The gasket 41 has a thickness and size that are enough to insulate the top plate 30 and the positive electrode terminal 40 from each other.

As illustrated in FIGS. 3 and 4, when an electrolyte (not shown) is injected into the lower can 20 in the state in which the top insulator 50 and the bottom insulator 60 are stacked on the electrode assembly 10, the top insulator 50 and the bottom insulator 60 absorb the electrolyte to increase in volume. Thus, spaces inside each of the lower can 20 and the top plate 30 are filled by the increase in volume of the expanded top insulator 50 and bottom insulator 60, respectively.

Here, the top insulator 50 may cover the entire top surface of the electrode assembly, and the bottom insulator 60 may be provided in a plate shape having a size capable of covering the entire bottom surface of the electrode assembly. In addition, when the top insulator 50 and the bottom insulator 60 absorb the electrolyte so as to be expanded, the electrode assembly 10 may be expanded to the extent that the top insulator 50 and the bottom insulator 60 are capable of elastically pressing the electrode assembly 10 upward and downward from upper and lower sides.

In addition, one of the top insulator 50 and the bottom insulator 60 may be configured to be more expanded vertically than the other one according to a height of the electrode assembly 10 and a height of the sidewall 22.

For example, as the impact transmitted from the positive electrode terminal 40 is more efficiently buffered, a buffering effect of the top insulator 50 may be greater than that of the bottom insulator 60. That is, the top insulator may more absorb the electrolyte and thus be more expanded in volume, or vice versa.

Particularly, in the present invention, at least one of the top insulator 50 or the bottom insulator 60, preferably both the top insulator 50 and the bottom insulator 60 are coated with a protective layer that prevents thermal shrinkage from occurring.

That is, the present invention provides a button-type secondary battery, in which the protective layer is applied on surfaces of the top insulator 50 and the bottom insulator 60 as another embodiment.

As described above, the protective layer 70 may be applied not only on a surface facing the positive electrode terminal 40, but also on an opposite surface thereof. In addition, the protective layer 70 may be applied to one or all of both the surfaces of the bottom insulator 60.

However, if the protective layer 70 is applied on only one surface of each of the top insulator 50 and the bottom insulator 60 for reasons of production cost and process, the protective layer 70 is applied to a surface opposite to the surface facing the electrode assembly 10, that is, a surface placed at an upper side in the top insulator 50 and a surface placed at a lower side in the bottom insulator 60.

In addition, if a coating layer 70 is formed on only one of the top insulator 50 and the bottom insulator 60, it is preferable that the coating layer 70 is formed on the surface of the top insulator 50 that is capable of being hit by the positive terminal 40.

The protective layer 70 includes inorganic particles that impart heat resistance to the protective layer 70. More specifically, the protective layer is prepared by mixing inorganic particles and a binder polymer. Here, the inorganic particles are provided in a nano-scale (nano unit size). More specifically, a mixture of inorganic particles and a binder polymer, which is disclosed in Patent Registration No. 10-0775310, may be used as a coating layer applied on a base material of a separator.

The coating layer 70 does not cause the thermal shrinkage of the top insulator 50 and the bottom insulator 60 at a high temperature (for example, a temperature in the range of 120° C. to 140° C.) due to the heat resistance of the inorganic particles.

Figure 5:
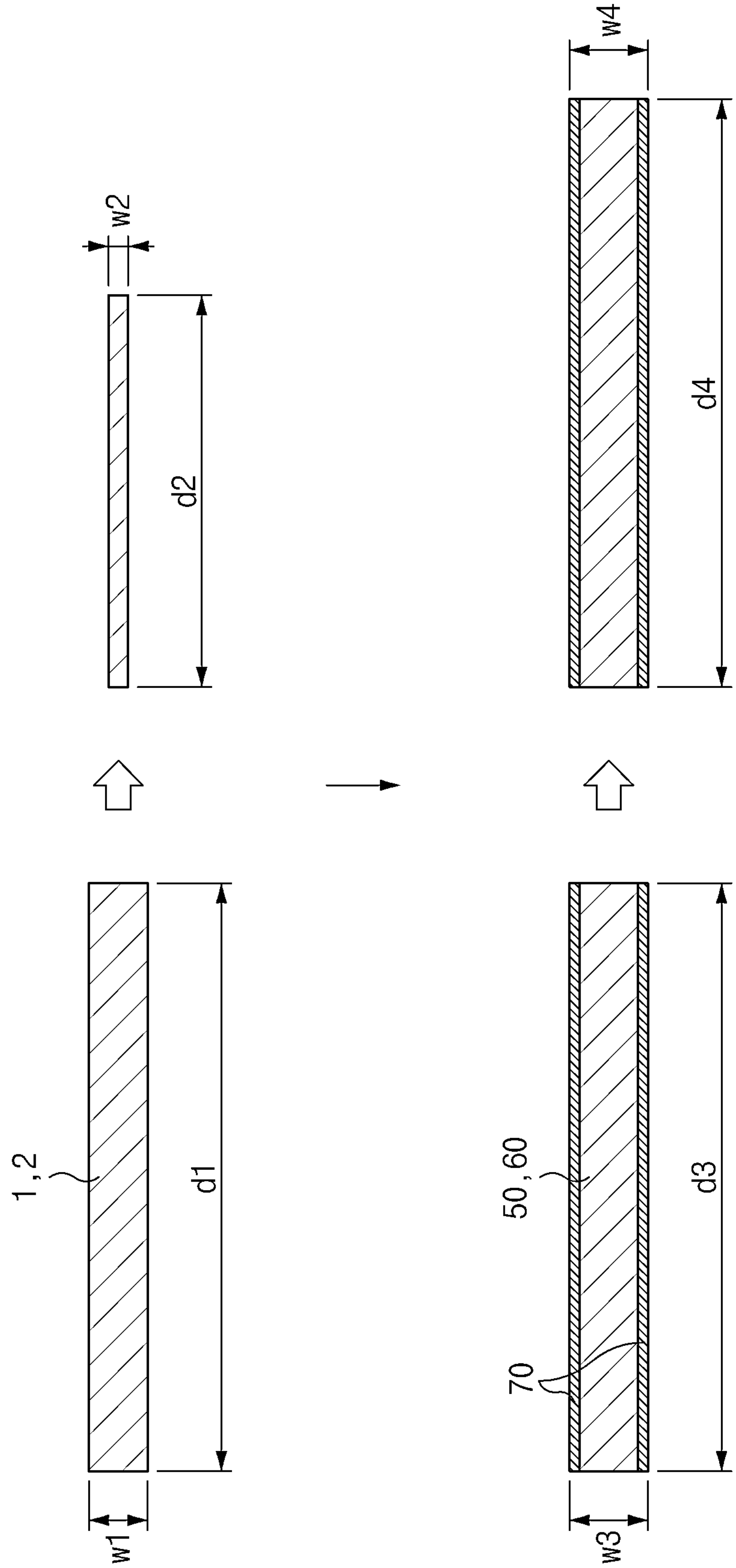
FIG. 5 is a view illustrating before and after states (upper drawing) when heat is applied to top and bottom insulators, which are not coated with a protective layer, according to the related art, and before and after states (lower drawing) when heat is applied to the top and bottom insulators, which are coated with the protective layer, according to the present invention.
Figure 6:
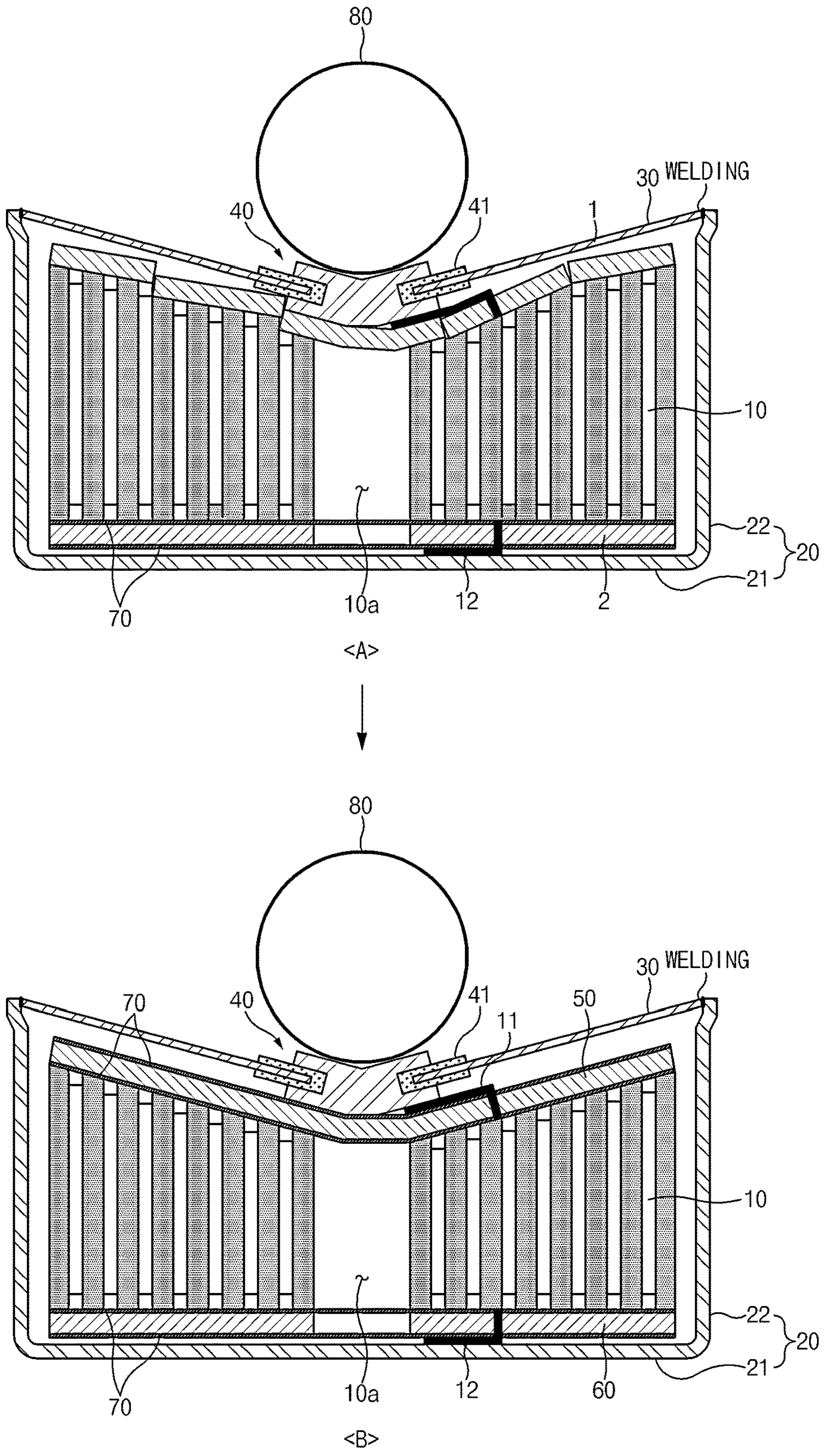
FIG. 6 is a view illustrating a state (upper drawing: A) in which the top insulator, which is not coated with the protective layer, is deformed, and a state (lower drawing: B) in which the top insulator, which is coated with the protective layer, is deformed when an impact bar 80 hits a positive electrode terminal during an impact test.

FIG. 5 is a view illustrating before and after states (upper drawing) when heat is applied to the top and bottom insulators 1 and 2, which are not coated with the protective layer 70, according to the related art, and before and after states (lower drawing) when heat is applied to the top and bottom insulators 50 and 60, which are coated with the protective layer 70, according to the present invention, and FIG. 6 is a view illustrating a state (upper drawing: A) in which the top insulator 1, which is not coated with the protective layer 70, is deformed, and a state (lower drawing: B) in which the top insulator 50, which is coated with the protective layer 70, is deformed when an impact bar 80 hits the positive electrode terminal 40 during an impact test.

That is, a swelling tape used in the fields of secondary batteries may be used for the bottom insulator 60 and the top insulator 50 so that the bottom insulator 60 and the top insulator 50 have electrical insulating properties and simultaneously absorb the electrolyte so as to be expanded.

However, as illustrated in FIG. 5, the bottom insulator and the top insulator provided as the swelling tape undergo thermal shrinkage together with vaporization of the absorbed electrolyte when high-temperature heat is applied.

Thus, when heat is applied to the bottom insulator 2 and top insulator 1 according to the related art without the protective layer 70, a thickness is reduced (w1→w2), and a length is also reduced (d1→d2).

On the other hand, the bottom insulator 60 and the top insulator 50 according to the present invention, which are coated with the protective layer 70 on their surfaces may be maintained at the same thickness and length even when the heat is applied (w3=w4, d3=d4).

Therefore, as illustrated in FIG. 6, during the impact test, when the impact bar 80 hits the positive electrode terminal 40 and the positive terminal 40 so that the positive electrode terminal 40 is in contact with the negative electrode of the electrode assembly 10, or the top plate 30 is in contact with the positive electrode of the electrode assembly 10.

Here, in the case <A> in which the protective layer 70 is not coated on the top insulator 50, the top insulator 1 is shrunk due to the heat generated by the short circuit, and a contact area between the positive electrode and a top plate 30 or a contact area between the negative electrode and a positive electrode terminal 40 increases by a degree of shrinkage of the top insulator.

Therefore, since a size of the short circuit gradually increases as an area of the short circuit increases in the situation, in which only little heat is generated due to initial minute short circuit so that the short circuit is terminated, as the size of the short circuit gradually increases (as the short circuit current increases), a risk of fire or explosion increases.

On the other hand, in the case <B> in which the protective layer 70 is applied on the top insulator 70, the top insulator 50 may be maintained in its original area due to the heat generated by the short circuit. Therefore, the short-circuit state is maintained with the size of the initial minute short-circuit caused by the hitting of the impact bar 80, and then, the current is cut off to terminate the situation (that is, since the short-circuit current does not increase, but gradually decreases, an amount of generated heat also gradually decreases so as not to lead to the fire or explosion.

That is, when the protective layer 70 is coated on the top insulator 50 and the bottom insulator 60 as in the present invention, even if the short circuit occurs from the impact applied from the upper and lower sides of the secondary battery, since the fire or explosion does not occur to terminate the situation, stability may be more improved.

According to the present invention having the above-described technical characteristics, since the bottom insulator 60 and the top insulator 50 are expanded to fill the space inside the lower can, the external impact transmitted to the electrode assembly 10 may be buffered and vibration is buffered, and the effect due to the vibration may be reduced.

In addition, since the effect of increasing in thickness of the bottom insulator 60 and the top insulator 50 is expected by applying the protective layer 70, not only the possibility of occurrence of the short circuit may be further reduced, but even if the short circuit occurs, only the minimal short-circuit current may be generated.

Therefore, the electrode assembly 10 may be prevented from being damaged, and the durability of the secondary battery may be further improved.

In addition, the degree of deformation of the top plate 30 and the lower can 20 may be reduced.

Since the bottom insulator 60 and the top insulator 50 are expanded in the state of being seated on the electrode assembly 10 to fill the empty space, there may be no need to increase in height of the lower can 20, preventing the volume from unnecessarily increasing.

Furthermore, the present invention may additionally provide the secondary battery module in which the plurality of button-type secondary batteries having the above characteristics are electrically connected to each other.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

100: Battery Module
101: Accommodation part

110: First frame
10: Electrode assembly
20: Lower can
30: Top plate
40: Positive electrode terminal
50: Top insulator
60: Bottom insulator
70: Protective layer

The invention claimed is:

1. A button-type secondary battery, comprising:

an electrode assembly including a negative electrode, a separator, and a positive electrode wound together, the electrode assembly further including a negative electrode tab extending downward and a positive electrode tab extending upward;

a lower can including a bottom surface, a sidewall extending upward along a circumference of the bottom surface thereof, the electrode assembly and an electrolyte being disposed in the lower can;

a top plate including an edge coupled to an upper end of the sidewall of the lower can to close the lower can;

a positive electrode terminal coupled to the top plate through a gasket to be electrically insulated from the top plate, a portion of the positive electrode terminal passing through a hole in the top plate to be bonded to the positive electrode tab; and a top insulator that is electrically insulating and covering a top surface of the electrode assembly;

a bottom insulator that is electrically insulating and covering a bottom surface of the electrode assembly, wherein each of the top insulator and the bottom insulator being configured to expand in volume by absorbing the electrolyte, and wherein surfaces of the top insulator or the bottom insulator are coated with a protective layer of a single layer configured to prevent thermal shrinkage from occurring, the protective layer of the single layer comprising inorganic particles configured to provide heat resistance to the protective layer.

2. The button-type secondary battery of claim 1, wherein the top insulator covers an entire top surface of the electrode assembly, and wherein the bottom insulator has a plate shape having a size to cover an entire bottom surface of the electrode assembly.

3. The button-type secondary battery of claim 1, wherein the positive electrode terminal is coupled in a rivet method in which a diameter of each of an upper end and a lower end is expanded more than that of a portion passing through the hole of the top plate.

4. The button-type secondary battery of claim 1, wherein the protective layer includes the inorganic particles mixed with a binder polymer that provides bonding force to adhere to the surface of the top insulator or the bottom insulator.

5. The button-type secondary battery of claim 1, wherein, when the top insulator and the bottom insulator absorb the electrolyte to be expanded, each of the top insulator and the bottom insulator is expanded to elastically press the electrode assembly vertically downward from an upper side.

6. The button-type secondary battery of claim 5, wherein one of the top insulator and the bottom insulator is vertically expanded more than the other one of the top insulator and the bottom insulator.

7. The button-type secondary battery of claim 1, wherein the protective layer is applied to a surface of each of the top insulator and the bottom insulator.

8. The button-type secondary battery of claim 7, wherein the protective layer is applied to all of a surface of the top insulator that faces the positive electrode terminal, and an opposite surface of the top insulator, and wherein the protective layer is applied to all of a surface of the bottom insulator that faces the bottom surface of the lower can, and an opposite surface of the top insulator.

9. A secondary battery module, comprising a plurality of button type secondary batteries according to claim 1 electrically connected to each other.

* * * * *